US012752199B2

(12) United States Patent
Sannino et al.

(10) Patent No.: US 12,752,199 B2
(45) Date of Patent: Oct. 6, 2026

(54) ADAPTIVE SCREEN SHARE POINTER AND REACTIONS DURING GAMEPLAY

(71) Applicant: Sony Interactive Entertainment Inc., Tokyo (JP)

(72) Inventors: Emil Sannino, San Mateo, CA (US); Shogo Suzuki, San Mateo, CA (US); Andrew Lee, San Mateo, CA (US); Bryce Botorowicz, San Mateo, CA (US); David Gonzalez, San Mateo, CA (US); Hiroaki Tano, San Mateo, CA (US); Kazushi Yoshida, San Mateo, CA (US); Toru Mineyama, San Mateo, CA (US); Steve Agosten, San Mateo, CA (US); William Scott Watson, San Mateo, CA (US); Michael Starich, San Mateo, CA (US); Joseph Kimura, San Mateo, CA (US); Corbin Percy, San Mateo, CA (US); Akshay Rao, San Mateo, CA (US); Yu Aoki, San Mateo, CA (US); Daisuke Nakayama, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 384 days.

(21) Appl. No.: 18/493,987

(22) Filed: Oct. 25, 2023

(65) Prior Publication Data

US 2025/0135360 A1 May 1, 2025

(51) Int. Cl.
*A63F 13/86* (2014.01)
*A63F 13/573* (2014.01)

(52) U.S. Cl.
CPC ............ *A63F 13/86* (2014.09); *A63F 13/573* (2014.09)

(58) Field of Classification Search
CPC ........................................................ A63F 13/86
See application file for complete search history.

(56) References Cited

U.S. PATENT DOCUMENTS

| | | | | |
|---|---|---|---|---|
| 10,341,537 | B2 | 7/2019 | Sarkar | |
| 11,082,666 | B1 * | 8/2021 | Florentino | A63F 13/70 |
| 2017/0001111 | A1 * | 1/2017 | Willette | A63F 13/49 |
| 2017/0087455 | A1 * | 3/2017 | Black | A63F 13/44 |

(Continued)

FOREIGN PATENT DOCUMENTS

| | | | |
|---|---|---|---|
| GB | 2598577 | A | 3/2022 |
| JP | 2009064364 | A | 3/2009 |

(Continued)

OTHER PUBLICATIONS

JP2024-188389 , "Office Action", Feb. 10, 2026, 6 pages.

(Continued)

*Primary Examiner* — Jay Trent Liddle
(74) *Attorney, Agent, or Firm* — Kilpatrick Townsend & Stockton LLP

(57) ABSTRACT

Game-specific screen share features can be provided to viewers of a video game livestream. The viewers can control a themed or adaptive cursor presented to the gamer during gameplay, and can also provide themed or adaptive sentiment-based reactions to the gamer during gameplay. The cursor and reactions can then be surfaced to the gamer a number of ways and can even be tied back into the game execution environment itself.

20 Claims, 15 Drawing Sheets

(56) References Cited

U.S. PATENT DOCUMENTS

| | | | | |
|---|---|---|---|---|
| 2019/0046886 | A1* | 2/2019 | George ................ | A63F 13/211 |
| 2022/0004253 | A1* | 1/2022 | Cappello ............. | G02B 27/017 |
| 2022/0171960 | A1 | 6/2022 | Nelson et al. | |

FOREIGN PATENT DOCUMENTS

| | | | |
|---|---|---|---|
| JP | 2021023593 | A | 2/2021 |
| JP | 2022026821 | A | 2/2022 |
| WO | 2014068806 | A1 | 5/2014 |

OTHER PUBLICATIONS

EP24208638.7, "Extended European Search Report" Feb. 27, 2025, 8 pages.
JP2024-188389, "Office Action", Sep. 30, 2025, 11 pages.

* cited by examiner

ADAPTIVE SCREEN SHARE POINTER AND REACTIONS DURING GAMEPLAY

FIELD

The disclosure below relates generally to adaptive screen share pointers and reactions for computer gameplay.

BACKGROUND

As understood herein, some video gamers stream their gameplay to others so that the other people can watch their gameplay. As also recognized herein, current systems are technologically limited in their ability to provide adequate viewer participation, which present principles recognize may provide for a more robust and engaging viewing experience from a technological perspective.

SUMMARY

Accordingly, present principles are directed to enhancing the overall execution environment of the game itself as well as providing enriched technology-based interactivity features.

As such, in one aspect an apparatus includes a processor assembly programmed with instructions to execute a computer game in which a first person plays the computer game. The processor assembly is also programmed with instructions to receive input from a second person that is viewing a livestream of the computer game but that is not controlling a character of the game, where the input includes a cursor control command and/or a graphic-based reaction. Based on the input, the processor assembly is programmed with instructions to present an output on a display associated with the first person, where the output indicates the input in a game-specific context.

In certain example implementations, the output may include the cursor being presented in an appearance associated with an ongoing game context for the computer game. Additionally or alternatively, the output may include the cursor being presented in an appearance relevant to a current game event.

As another example, the cursor control command may be a first cursor control command and the processor assembly may be configured to execute the first cursor control command during a first portion of the computer game. Per this example, the processor assembly may also be configured to determine that a cutscene is occurring and, based on the determination, decline to process additional cursor control commands.

As yet another example, again the cursor control command may be a first cursor control command but here the processor assembly may be configured to rotate permission to issue cursor control commands between viewers of the computer game based on past viewer inputs related to the first person's gameplay of the computer game.

Also consistent with present principles, in some cases the processor assembly may be configured to present, on a display associated with the second person, a selectable graphical object. Here the processor assembly may also be configured to receive the cursor control command, where the cursor control command may select the selectable graphical object, and to control an output of the computer game as presented on the display associated with the first person based on the cursor control command. The output of the computer game may have an effect that changes the current game state of the computer game.

Still further, if desired the processor assembly may be configured to receive the cursor control command, where the cursor control command may direct placement of a graphical object associated with the second person at a persistent location within the field of view of the first person as presented on the display. Based on the cursor control command, the processor assembly may be configured to present the graphical object at the persistent location.

As another example implementation, the processor assembly may be configured to receive the cursor control command where the command selects a game object and then to, based on the cursor control command, highlight the selected game object. The highlighting may not include a tracing of the cursor control command itself.

Additionally, in some cases the processor assembly may be configured to receive the cursor control command and, based on the cursor control command, execute a predefined game action reserved for non-character-controlling people to instigate during the computer game.

As another example, the input may include eye movement input associated with the second person, and here the processor assembly may be configured to move the cursor on the display according to the eye movement input, determine that the second person has closed one eye, and alter the appearance of the cursor as presented on the display based on the determination.

If desired, the processor assembly may also be configured to present the cursor on the display in a visual appearance conveying a sentiment about terrain over which the first person's game character is moving.

As yet another example, the processor assembly may be configured to present the cursor on the display in a visual appearance indicating data regarding a first game character's current game statistics, where the first game character may be a game character not controlled by the first person.

In terms of graphic-based reactions, in some cases the processor assembly may be configured to receive respective graphic-based reactions from respective people that are viewing the livestream but not controlling a character of the game and, responsive to a predetermined graphic-based reaction threshold being met, alter playout of the computer game. The predetermined graphic-based reaction threshold may relate to more than one graphic-based reaction of a same type being received.

Additionally or alternatively, the processor assembly may be configured to present haptic feedback to the first person based on the graphic-based reaction, where the haptic feedback may vary based on a reaction type associated with the graphic-based reaction.

In another aspect, a method includes executing a computer game in which a first person plays the computer game and receiving input from a second person that is viewing a livestream of the computer game but that is not controlling a character of the game. The input includes a cursor control command and/or a sentiment-based reaction. The method also includes, based on the input, presenting a game output on a display associated with the first person.

In one example, the method may include aggregating sentiment-based reactions provided by plural viewers and, based on the aggregation, presenting a reaction summary to the first person.

In still another aspect, a system includes at least one computer storage that is not a transitory signal. The computer storage includes instructions executable by at least one processor to execute a computer game in which a first person plays the computer game and to receive input from a second person that is viewing a livestream of the computer game.

The input includes a cursor control command and/or a sentiment-based reaction. The instructions are also executable to present an output on a display associated with the first person based on the input.

In one example, the instructions may be executable to award at least one trophy to the first person based on an amount of sentiment-based reactions that are received while playing one or more particular aspects of the computer game, and to reward at least one viewer of the livestream based on inputs provided by that viewer. The inputs may be established by one or more cursor control commands and/or sentiment-based reactions.

The details of the present application, both as to its structure and operation, can be best understood in reference to the accompanying drawings, in which like reference numerals refer to like parts, and in which:

DETAILED DESCRIPTION

Figure 1:
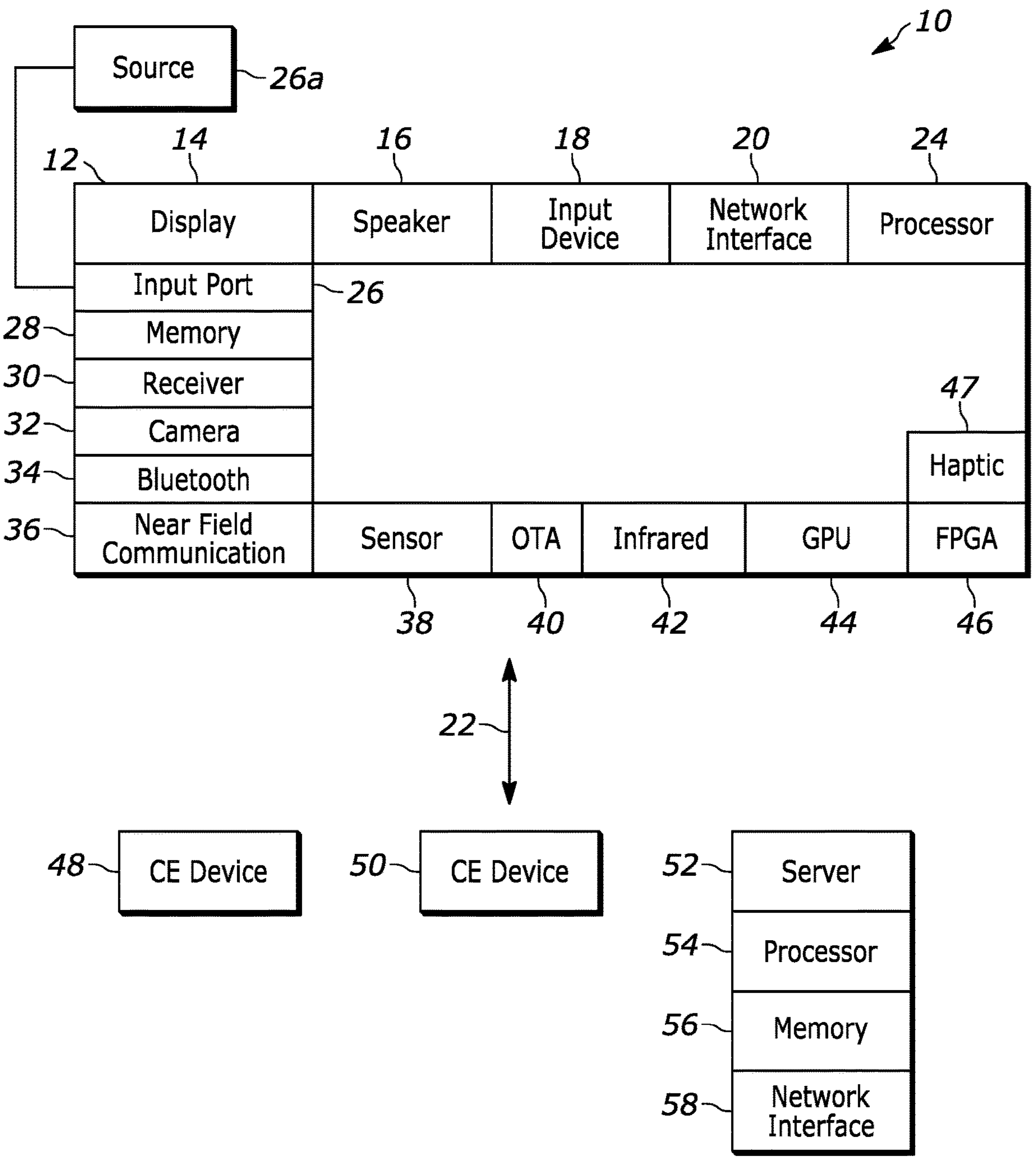
FIG. 1 is a block diagram of an example system consistent with present principles.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or a client and server can be connected over a local intranet or a virtual private network. A server or controller may be instantiated by a game console such as a Sony PlayStation©, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

A processor may be a single- or multi-chip processor that can execute logic by means of various lines such as address lines, data lines, and control lines and registers and shift registers. A processor assembly may include one or more processors acting independently or in concert with each other to execute an algorithm, whether those processors are in one device or more than one device.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Present principles may employ machine learning models, including deep learning models. Machine learning models use various algorithms trained in ways that include supervised learning, unsupervised learning, semi-supervised learning, reinforcement learning, feature learning, self learning, and other forms of learning. Examples of such algorithms, which can be implemented by computer circuitry, include one or more neural networks, such as a convolutional neural network (CNN), recurrent neural network (RNN) which may be appropriate to learn information from a series of images, and a type of RNN known as a long short-term memory (LSTM) network. Support vector machines (SVM) and Bayesian networks also may be considered to be examples of machine learning models.

As understood herein, performing machine learning involves accessing and then training a model on training data to enable the model to process further data to make predictions. A neural network may include an input layer, an output layer, and multiple hidden layers in between that are configured and weighted to make inferences about an appropriate output.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). The AVD 12 alternatively may also be a computerized Internet enabled ("smart") telephone, a tablet computer, a notebook computer, a HMID, a wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a USB port to physically connect to another CE device and/or a headphone port to connect headphones to the AVD 12 for presentation of audio from the AVD 12 to a user through the headphones. For example, the input port 26 may be connected via wire or wirelessly to a cable or satellite source **26*a* of audio video content. Thus, the source 26*a* may be a separate or integrated set top box, or a satellite receiver. Or the source 26*a* may be a game console or disk player containing content. The source 26*a* when implemented as a game console may include some or all of the components described below in relation to the CE device 48**.

The AVD 12 may further include one or more computer memories 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24. The component 30 may also be implemented by an inertial measurement unit (IMU) that typically includes a combination of accelerometers, gyroscopes, and magnetometers to determine the location and orientation of the AVD 12 in three dimension or by an event-based sensors.

Continuing the description of the AVD 12, in some embodiments the AVD 12 may include one or more cameras 32 that may be a thermal imaging camera, a digital camera such as a webcam, an event-based sensor, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 (e.g., a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command), providing input to the processor 24. The AVD 12 may include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics generators 47 may be provided for generating tactile signals that can be sensed by a person holding or in contact with the device.

Still referring to FIG. 1, in addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other devices of FIG. 1 over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown in FIG. 1 or nearby.

The components shown in the following figures may include some or all components shown in FIG. 1. The user interfaces (UI) described herein may be consolidated, expanded, and UI elements may be mixed and matched between UIs.

With the foregoing in mind, present principles recognize that screen sharing of computer/video games may allow gainers and viewers to share any game moment and content with each other. Aspects below may be combined with game streaming services where the flows of communication may be more one-to-many, and the viewers need not necessarily even be friends of the gamer but unacquainted viewers. These aspects along with others discussed below may help enhance the social game play experience and the technological capabilities of computer-based gaming systems in particular.

Thus, according to the disclosure below, share screen functionality may fill the gamer's desire to easily and directly share real time gaming moments with friends and others to enjoy the moments together. Gainers may therefore casually stream their gameplay to friends and small groups in real time, while chatting and playing together in parties and other scenarios, creating a sense of togetherness despite the distributed and sometimes detached nature of computer-based gaming in particular. Present principles may be employed on video game consoles, on mobile applications executable at smartphones and other mobile devices, and on other types of devices including laptop and desktop computers.

Figure 2:
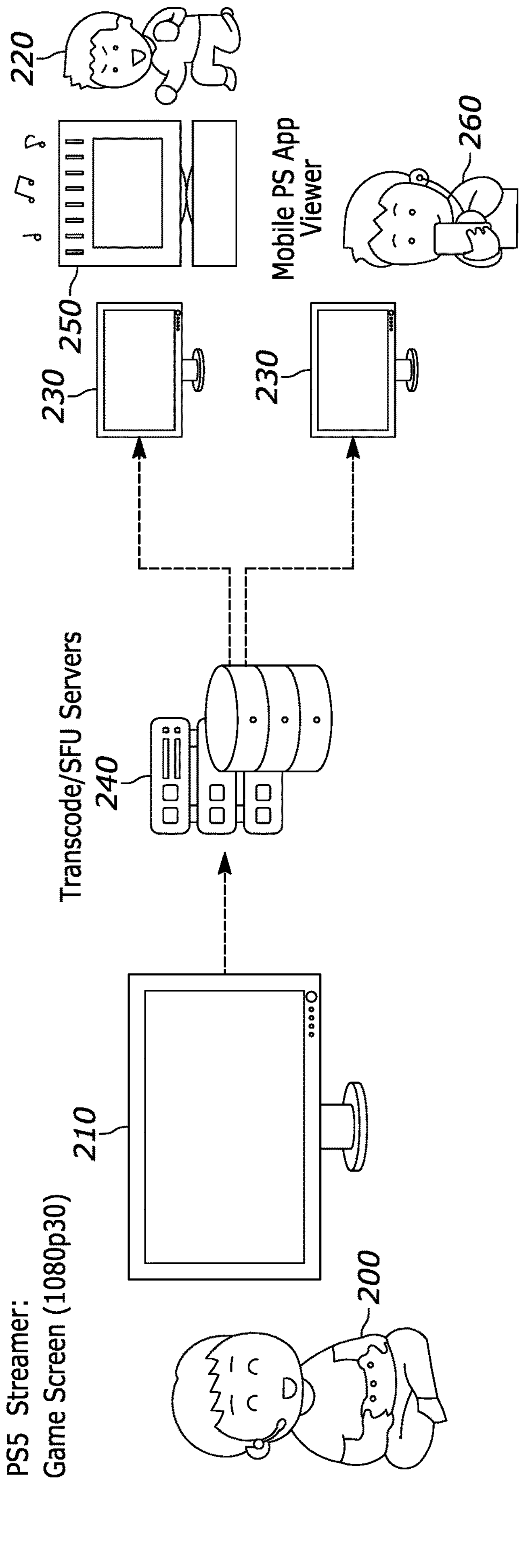
FIG. 2 shows a schematic diagram of a streamer playing a video game and streaming the gameplay to viewers that are using different types of devices to view the gameplay consistent with present principles.

With the foregoing in mind, reference is made to FIG. 2. This figure shows a PlayStation 5 gamer 200 playing a computer game whose visual content is presented on a local television display 210 in 1080p definition at a thirty frames-per-second (fps) frame rate. The gamer/streamer 200 is also steaming his/her gameplay to a remotely-located viewer 220 that is observing audio and video (A/V) content 230 of the gameplay on another television 250 once the A/V content stream is routed through one or more transcode/selective forwarding unit (SFU) servers 240 and then received by a local game console wired to the local television 250 in the personal residence of the viewer 220. The gameplay is also being streamed to a mobile application viewer 260, where the A/V content 230 is being observed on a smartphone once the A/V content stream is routed through the server(s) 240 and then received by a dedicated mobile application of a gaming console manufacturer that is executing at the smartphone. FIG. 2 thus demonstrates the different types of devices and systems that may be used to view the A/V content stream 230 of the gameplay.

Figure 3A:
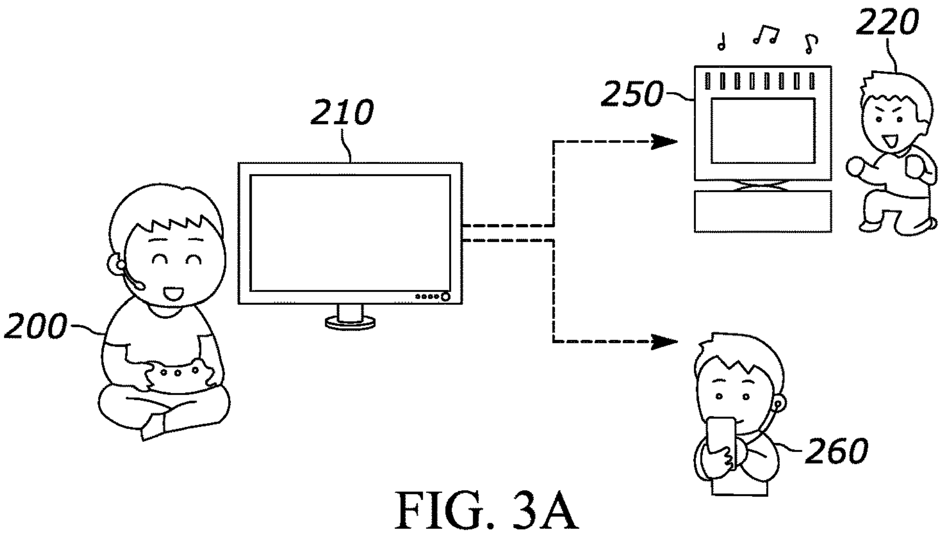
FIGS. 3A-3C show schematics of different types of streamer/viewer interactions that might take place consistent with present principles.
Figure 3B:
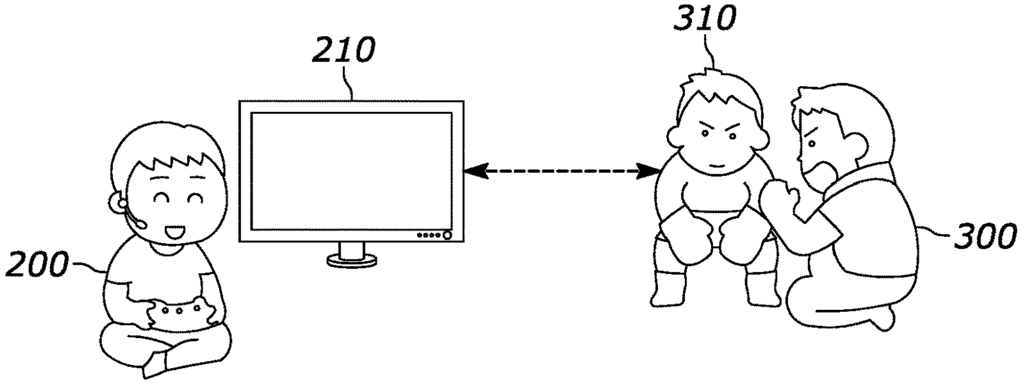
Figure 3C:
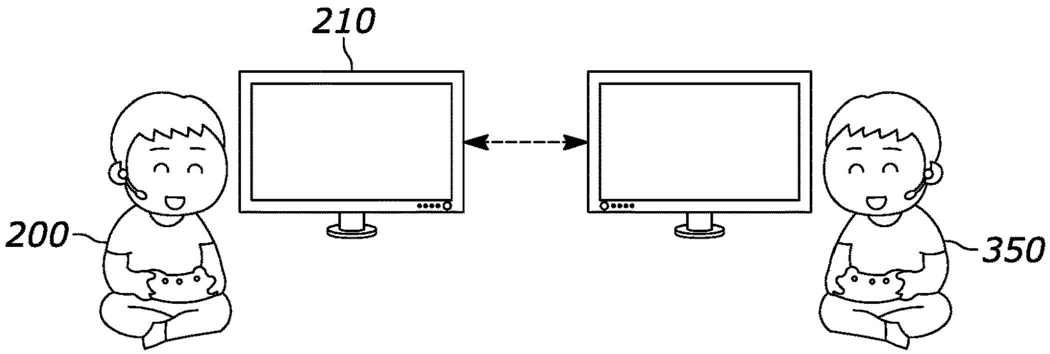

FIGS. 3A-3C further illustrate present principles. FIG. 3A illustrates that the gamer 200 may stream the gameplay through the server(s) 240 to one or more friends 220, 260 so those two viewers can watch along and enjoy the game together with the gamer 200 and each other.

FIG. 3B illustrates that the gamer/streamer 200 may stream the gameplay through the server(s) 240 to a friend 300 so that the friend 300 can help or coach the gamer 200 and, if the friend 300 is also playing the same game instance, so that the gamer 200 can also help or coach the viewer 300. Thus, it is to be understood that audio of the gamer 200 speaking as detected by a local microphone proximate to the gamer 200 may be streamed to the viewer 300, and vice versa. This might be accomplished through a separate, dedicated out-of-band audio channel or as part of the bi-directional game stream itself. Also note per FIG. 3B that the person 310 that is shown in FIG. 3B is a visual illustration of the gamer 200 to demonstrate the coaching that might occur (even though the gamer 200 and viewer 300 are remotely-located from each other at different geographic locations).

Turning to FIG. 3C, this figure demonstrates that streaming of the gameplay of the gamer/streamer 200 to a friend 350 may be used so that the gamer 200 and friend 350 may see each others' point of view (POV) while playing a multiplayer game (the POV of the opposing player as opposed to the relevant player's own point of view for his/her game character).

Figure 4:
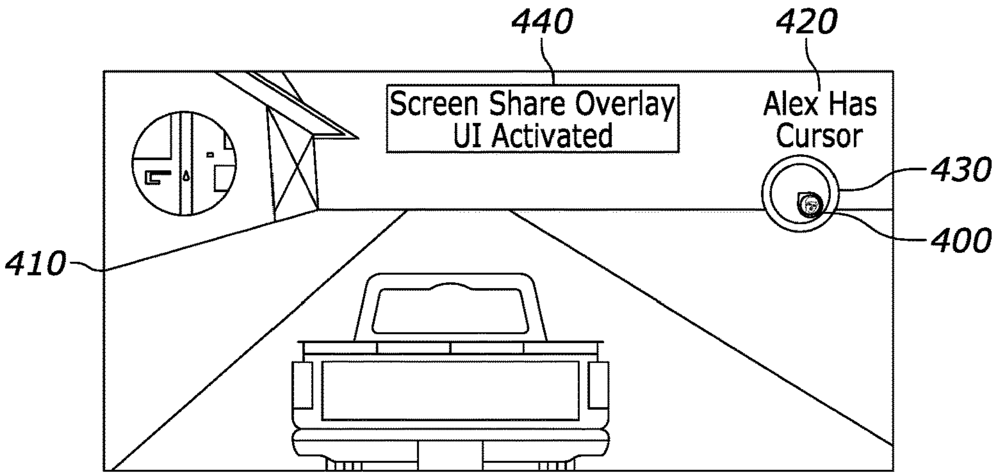
FIG. 4 shows a first example graphical user interface (GUI) overlaid on the point of view (POV) of a streamer as the streamer plays a computer game, where a certain viewer is controlling a cursor presented to the streamer on the GUI consistent with present principles.
Figure 5:
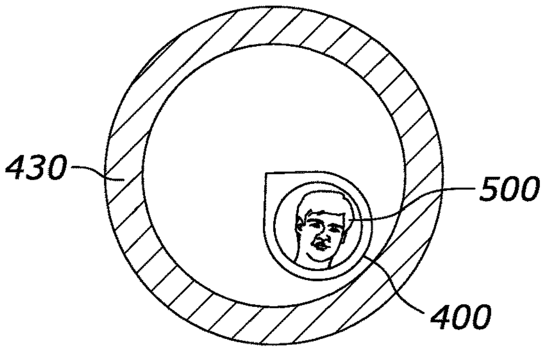
FIG. 5 shows a close-up view of the cursor of FIG. 4 consistent with present principles.

Turning to FIG. 4, it is recognized herein that the share screen experience can be expanded even further with unique interactive functionalities to drive viewer engagement and general share screen usage. These functionalities include pointer/cursor control features as well as reaction features. FIG. 4 shows an example of the former, where a pointer/cursor 400 is presented on the gamer/streamer's own display 410 while playing a particular video game, where the cursor 400 is being controlled by a remotely-located viewer named Alex. Owing to Alex controlling the cursor 400, a text indication 420 is overlaid on the game video as part of a streamer user interface (UI), with the indication 420 indicating Alex by name and indicating that he is controlling the cursor 400. As better shown in the zoomed-in close up view of the cursor 400 shown in FIG. 5, further note that the cursor 400 also contains or includes an image 500 associated with Alex (but not other active gamers/viewers). The image 500 may be a graphic or avatar associated with Alex, or even a profile picture of Alex himself.

Back to FIG. 4, note that a circle 430 is also shown as surrounding the cursor 400. This may help highlight a graphical object in the game to which the remotely-located viewer wishes to draw the gamer's attention as a possible area to travel to or explore with the gamer's virtual character. Thus, the viewer's own device or the intermediary server itself might track the position of the cursor 400 as it moves across the gamer's own POV as presented on the display 410. The device/server may then highlight (e.g., encircle) a graphical object of the game over which it is determined that the cursor 400 is positioned by presenting the larger, circular graphic overlay 430. In the present instance, the overlay 430 highlights a building which the viewer is indicating that the gamer should explore with the gamer's game character.

Also note that while positioning/hovering of the cursor over the game object may be one form of selection of the game object, another form of selection consistent with present principles may be left-click or right-click input to the game object with a mouse after the associated cursor controlled by the mouse has been placed over top of it, or even a touch-based selection of the game object if the viewer is using a touch-enabled display. Further note that, according to the specific example of FIG. 4, highlighting the game object may include presenting the overlay 430 but not presenting a digital tracing of the cursor control command itself (e.g., if the cursor control command involves moving the cursor 400 over the game object while left-click select input is continuously provided to thus draw on the streamer's screen according to movement of the cursor, though this aspect is also envisioned in other scenarios consistent with present principles).

FIG. 4 also shows that the game video as presented on the display 410 might also have an additional indication 440 overlaid thereon as part of the UI. The indication 440 indicates that screen sharing with the viewer is occurring and, as such, that the screen share overlay UI has been activated (with the UI presenting the elements 400, 420, and 430 per the description above in this example).

Figure 6:
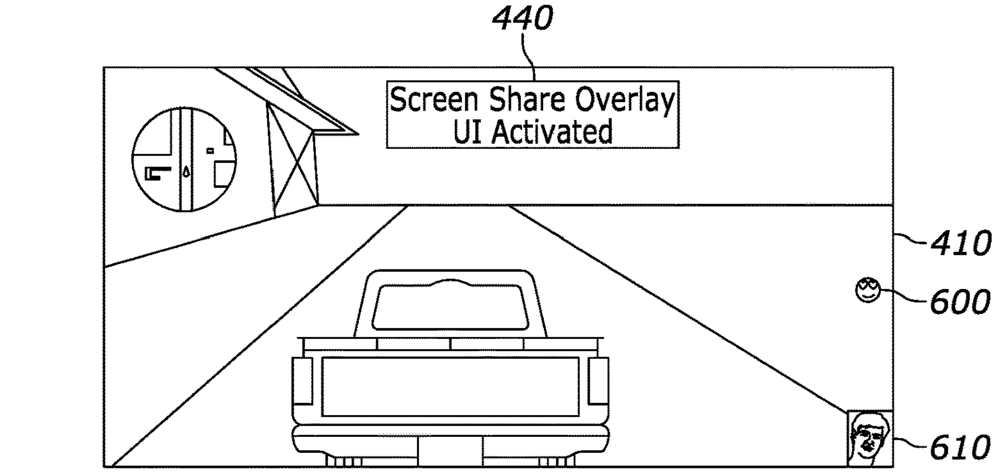
FIG. 6 shows an example GUI overlaid on the POV of the stream as the streamer plays a computer game, where a certain viewer has provided a sentiment-based reaction that is presented to the streamer consistent with present principles.

FIG. 6 continues with this example, but here a reaction by the viewer Alex is demonstrated via a smiling face with heart-shaped eyes emoji 600, which might have been provided by Alex to demonstrate that Alex loves what he is watching from the gamer as the gamer plays the computer game. An avatar or profile picture 610 of Alex is also shown so that the gamer can discern from whom the emoji 600 was provided. Note that the elements 600, 610 may be presented using the same UI as mentioned in the paragraphs above that is overlaid on the gamer/streamer's POV as the game is played out on the display 410. Additionally, other cursor and reaction elements discussed below may also be presented using this UI. It may thus be appreciated based on FIG. 6 that another aspect of present principles is that viewers are enabled to send reactions to the shared screen/AV feed UI in order to show support and celebration towards the streaming gamer.

Figure 7:
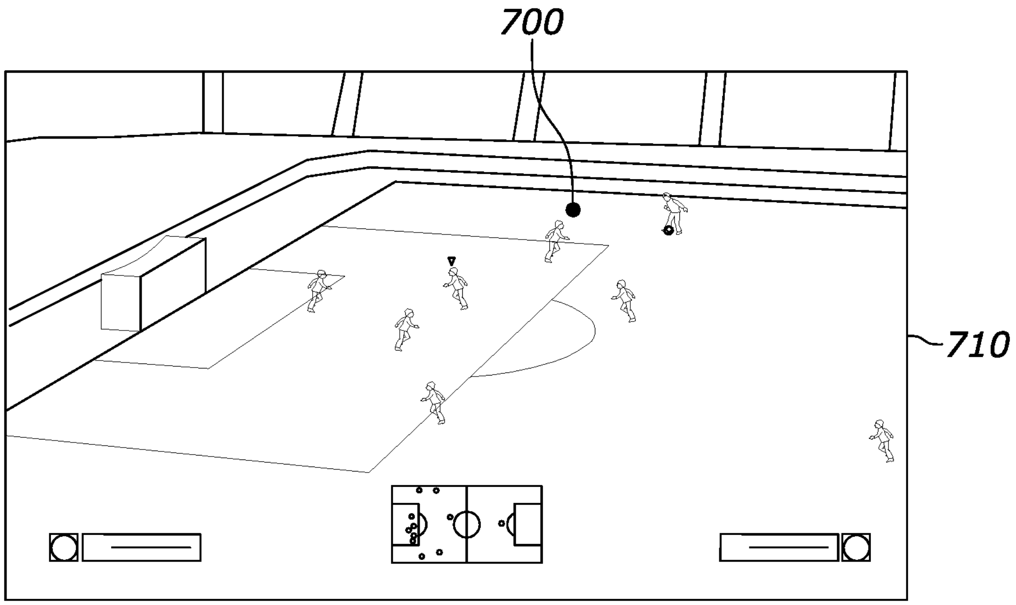
FIG. 7 shows an example consistent with present principles in the context of using a pointer to assist with competitive tactics while playing a sports computer game.

FIG. 7 further demonstrates present principles in a sports game competitive tactics scenario (soccer being the sport in this example). Suppose two friends are playing a soccer computer game and a third person viewer is coaching one of the streaming gamers. Since the viewer wants to show one of the streamers where they should pass the ball, the viewer can use the pointer/cursor 700 to draw on the screen/streamer POV 710 to demonstrate where on the virtual soccer field that streamer should pass the ball. For example, the cursor 700 may be positioned at a certain POV location, and then a select command or left click input (e.g., in the case of a mouse controlling the cursor 700) may be continuously provided to draw virtual ink in free hand according to subsequent movement of the cursor 700 while the select command continues to be provided. Then later when the game is over, the viewer can again use the pointer 700 to analyze certain game situations in-depth for the streamer in order to prepare the streamer better for the next game.

Figure 8:
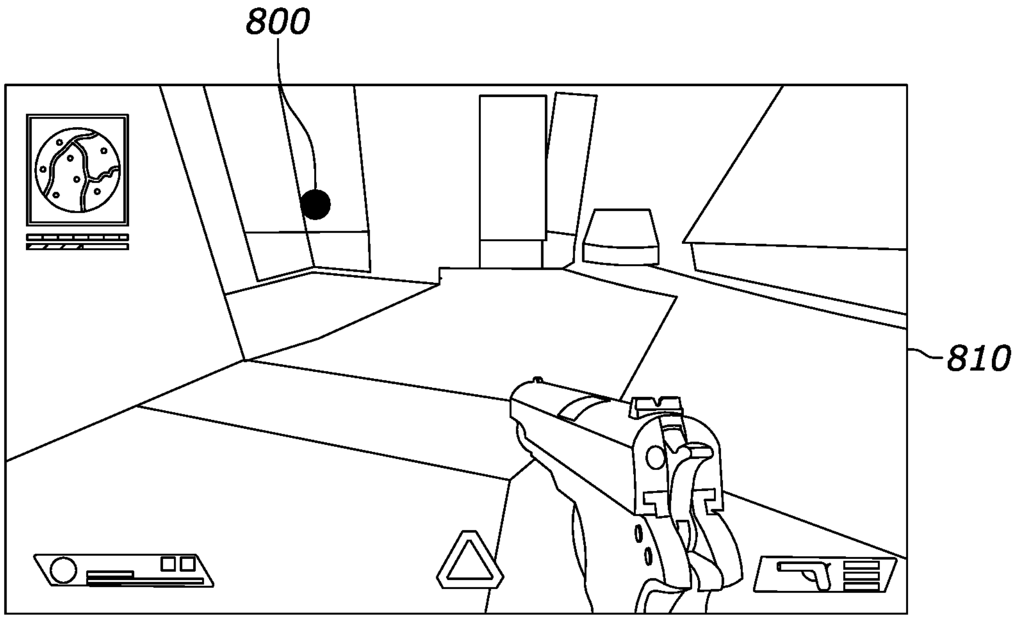
FIG. 8 shows an example consistent with present principles in the context of using a pointer to assist with competitive tactics while playing a first-person shooter computer game.

FIG. 8 shows another competitive tactics example. Here, shooter tactics might be exchanged. So suppose as an example that two friends are playing a first-person shooter computer game, but the viewer has already been eliminated and is just spectating until the end of the game. Also suppose the viewer wants to show the streamer (the other friend still playing the game) where to be positioned with his/her virtual character within the virtual world, and in what direction to face in order to secure a win in the game. The viewer may do so by controlling the cursor 800 as presented on the streamer's own screen 810 (as also mirrored on the viewer's screen). Also suppose that later the viewer spots virtual enemies coming from a certain direction and quickly uses the pointer/cursor 800 to indicate the direction from which the attack is coming.

Figure 9:
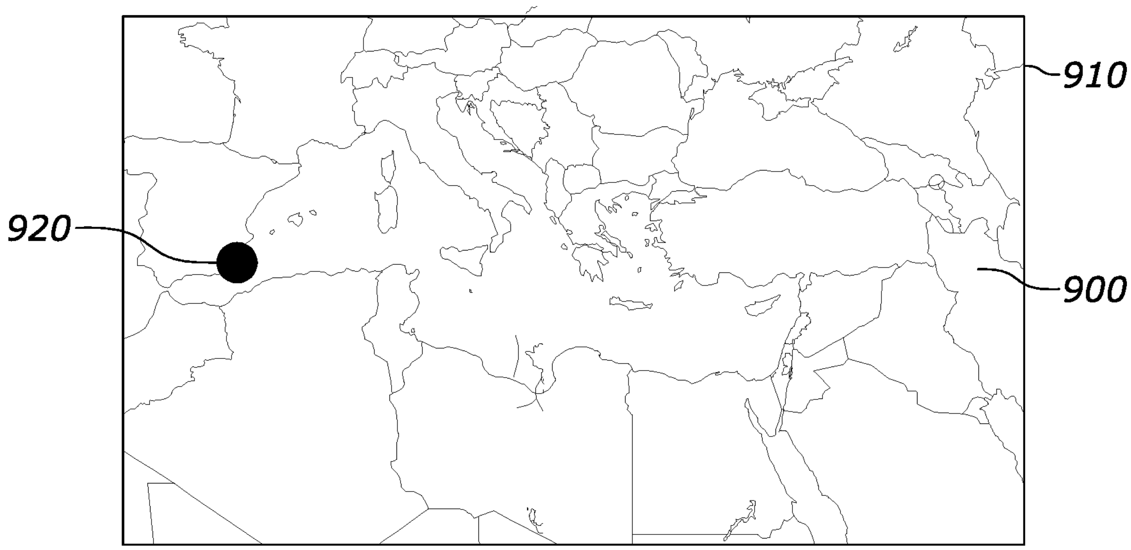
FIG. 9 shows an example consistent with present principles in the context of using a pointer to assist with virtual/game world exploration.

Turning to FIG. 9, yet another example is shown but here in terms of virtual world exploration. Accordingly, a virtual map 900 of the game world is presented on the display 910 of a streamer's device. So suppose the streamer is playing a certain game and is sharing his/her screen with the viewer so that they can explore the world together. The streamer is exploring a large area when the viewer notices an unexplored area and so the viewer uses the pointer/cursor 920 to mark exactly on the map 900 where the area is located. The viewer might do so simply by hovering the cursor 920 over that area or by providing selection input (e.g., a left-click mouse click) once the cursor 920 is over the area to command the game to, in response, persistently display an "X" marking on the map 900 for "X marks the spot".

Figure 10:
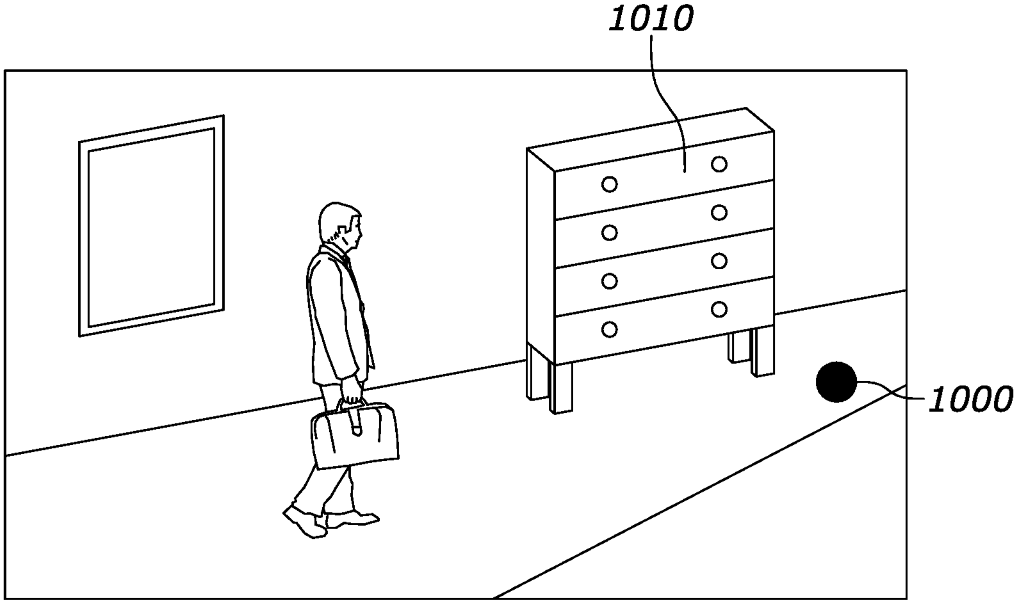
FIG. 10 shows an example consistent with present principles in the context of using a pointer to assist with looting/finding hidden game world objects.

Now in reference to FIG. 10, another virtual world exploration example is shown, this time in terms of looting. Suppose a streamer is playing a certain game while a viewer is watching and mainly just following the story line. The viewer then notices that the streamer did not check a potential loot pool. The viewer may therefore use the pointer/cursor 1000 to show the streamer on-screen where to look specifically (under or to the side of a virtual dresser 1010) and the viewer is thus now actively engaged in the game.

Figure 11:
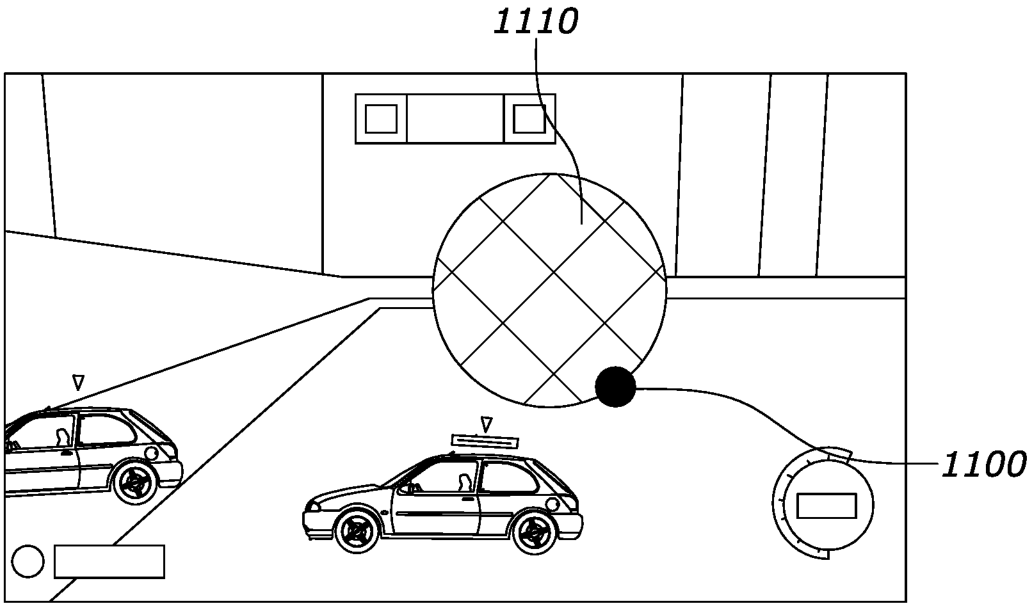
FIG. 11 shows an example consistent with present principles in the context of using a pointer to assist with how to strike a virtual ball.

Now two examples about using a pointer/cursor for highlighting will be described. Beginning with FIG. 11, suppose two friends are playing a certain game and one of the friends (the viewer in this example) is coaching the other friend (the streamer/gamer in this example). The viewer might notice that the streamer consistently misses the ball when taking a shot (e.g., kicking or knocking the ball towards goal). The viewer may thus use the pointer/cursor 1100 to mark what part of the ball 1110 the streamer should aim at to contact and hit the ball 1110 more accurately. The viewer thus demonstrates the "sweet spot" where the ball 1110 should be kicked.

Figure 12:
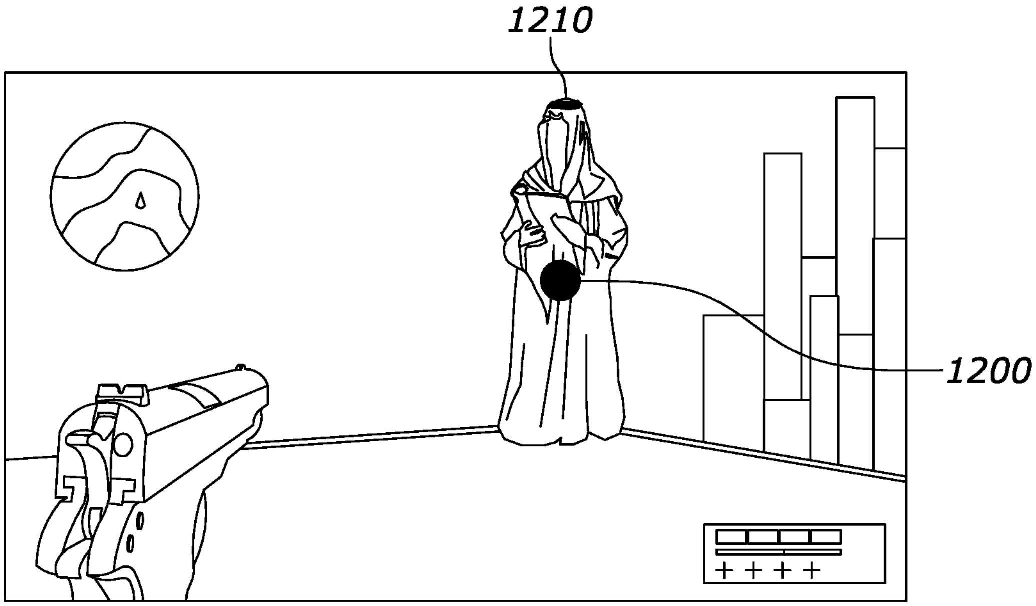
FIG. 12 shows an example consistent with present principles in the context of using a pointer to assist with beating a boss of a computer game.

Another example in terms of challenging situations is then shown in FIG. 12. Suppose a streamer is playing a certain game but is having issues with a demanding boss/enemy fight. The streamer then invites a friend who already finished/beat the boss 1210 to view the streamer's screen and assist. The viewer friend consults the streamer on weak parts of the streamer's attack plan and highlights exactly where/how to hit the boss 1210 using the pointer/cursor 1200.

Figure 13:
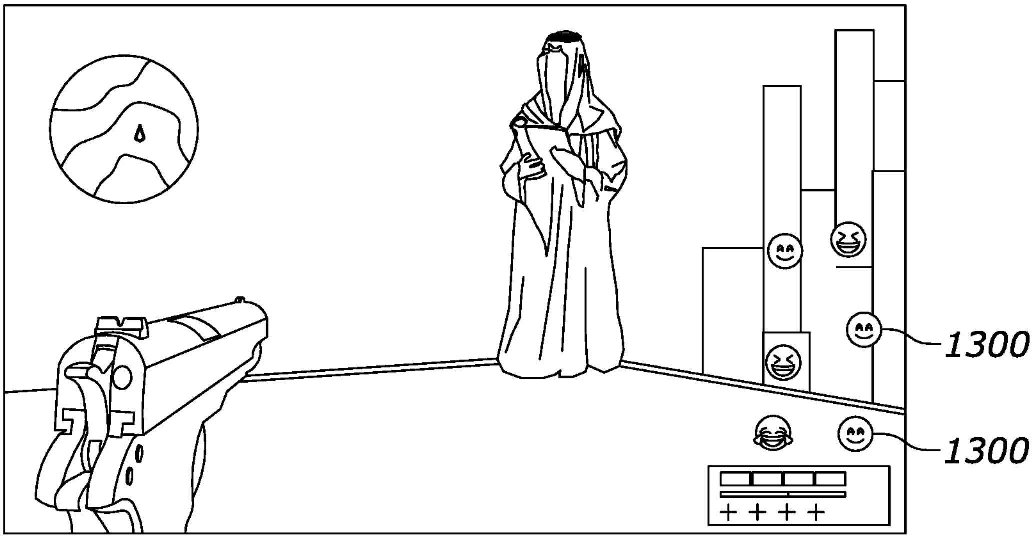
FIGS. 13-16 shows examples consistent with present principles where a group of viewers provide different reactions that are surfaced to the streamer in different game contexts.

Turning to examples involving reactions rather than pointer/cursor action per se, reference is now made to FIG. 13. This figure demonstrates a situation in which a large party of viewers have gathered together to watch the gameplay of a remotely-located streamer (and possibly play the same game instance themselves). Owing to the large group, it might be difficult for the streamer to keep track of who is saying what in the audio chat of all the people speaking amongst each other in the game stream. Instead of trying to pay attention to that, the viewers can provide respective emoji reactions 1300 with animated emotes to show their excitement and appreciation for a great move by the streamer in the game, doing so without causing confusion to the streamer. The streamer might then feel even better about the great move as the reactions 1300 on screen amplify the gaming experience. Here note that the reactions 1300 are mostly if not all positive.

Figure 14:
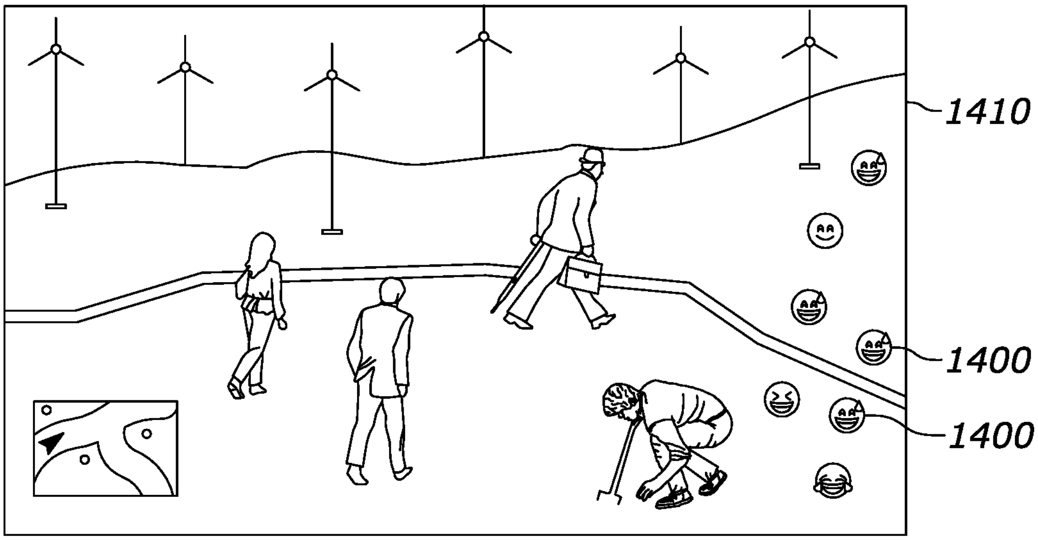

FIG. 14 then shows another situation where certain viewers might be muted from audio chat or simply cannot speak for whatever reason. Again a group of friends are playing a game together while others might just be viewing the collective gameplay of the gamers and hanging out. If some viewers do not have microphone access, are muted, etc., then those viewers can still participate in the fun by throwing some reactions 1400 on the screen 1410.

Figure 15:
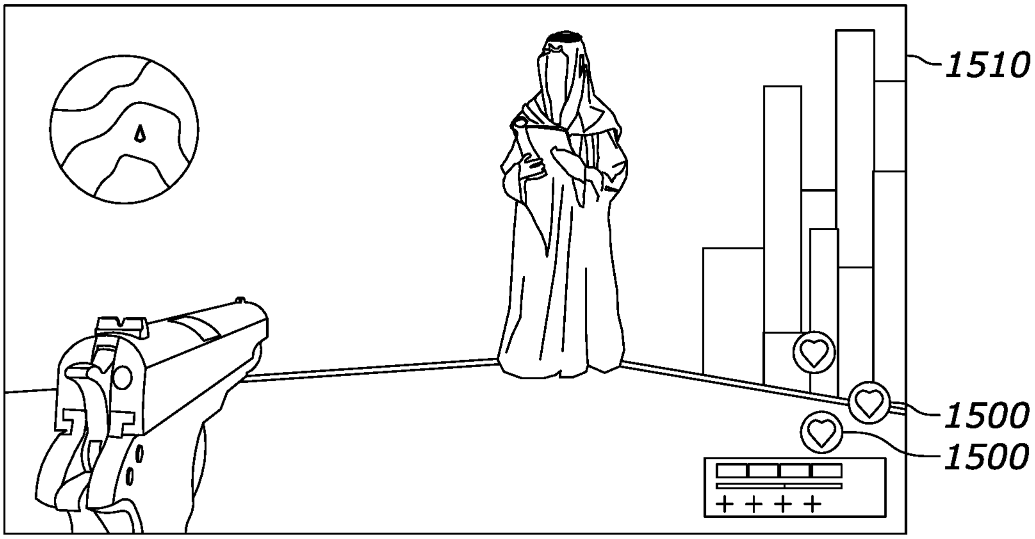
Figure 16:
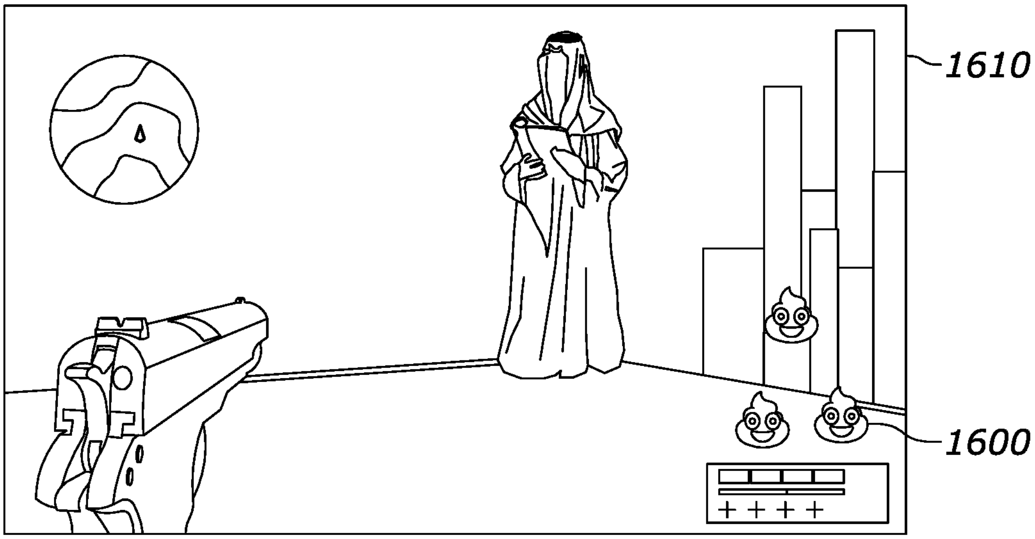

FIGS. 15 and 16 then show reaction scenarios for small parties. Per the small party scenario of FIG. 15, suppose two friends are playing a certain game and one of the players (the streamer in this example) is struggling to beat a difficult boss and keeps dying over and over again. The viewer may then decide to constantly react with a supportive emote 1500 every time to encourage the streamer to continue. The emotes 1500 may be hearts as shown and, even if provided by the viewer at different times, may be persistently displayed on the streamer's screen 1510.

FIG. 16 then shows a trolling scenario where two friends are playing a game together and the streamer (one of the players) is trying to build/complete a challenging structure. The viewer (the other player) might find it funny that the streamer cannot do so and may tease the streamer by adding a funny reaction every time the streamer is almost there. In the present instance, the reactions include excrement/poop emojis 1600 that may be persistently presented on the streamer's screen 1610 until the streamer successfully completes the task, responsive to which the emojis 1600 may be removed from presentation.

Continuing now in reference to FIGS. 17-20, it is to be understood that adaptive pointers/cursors may be presented consistent with the description above based on game context (e.g., the cursor matching the ongoing game context in appearance and behavior/animation). The game engine might therefore use an artificial neural network (ANN) such as a feed-forward neural network, deep neural network, or other type of context recognition or pattern recognition neural network to identify a current game context and then adjust the cursor's appearance in response. The ANN may be trained unsupervised on one or more sets of training data that include respective contexts (and/or raw game state data which might include metadata, video data, and audio data from which context can be determined). The training dataset may also include, for each respective context/game data, respective ground truth pointer appearances to present.

Then during deployment of the ANN while a given game instance is being executed, the executing device may receive game state data and/or the current game context from the game engine itself, or may simply receive the A/V data from the game if it does not have access to the game engine itself (e.g. for older legacy games). The device may then determine a context from the game state data/AV data if not provided directly by game engine, and either way then provides the received/determined context and/or raw game state data to the ANN as input for the ANN to then generate an inference output in response. The output may be a cursor image to present or reference identifier for the type of cursor to look up and present. The device may then present the inferred cursor image that corresponds to the output.

Accordingly, note that in some examples the different cursors themselves may all be included in a reference library of cursors that is accessible to the system. The cursors may each have their own reference ID. Some or all of the cursors in the library may have been used as ground truth for the training discussed above, and therefore the cursors need not be dynamically generated on the fly during gameplay but rather the inference output from the ANN may indicate a certain cursor from the library to use. But in other examples, a cursor image may in fact be indicated in the output even if not tied to an existing reference cursor, and the system might therefore use a generative image output by the ANN as the cursor image.

Figure 17:
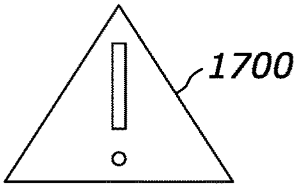
FIGS. 17-20 and 22 show different example adaptive cursors that may be controlled by viewers and presented to a streamer consistent with present principles.
Figure 18:
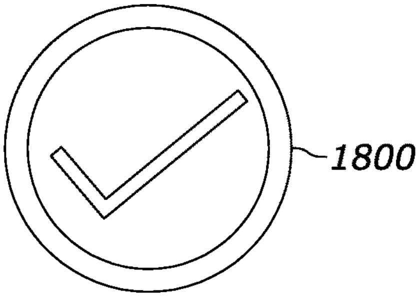

With the foregoing in mind, reference is made specifically to FIG. 17. This figure shows a triangular cursor 1700 with exclamation mark inside, which might be presented during combat sequences in certain video games. Additionally, the cursor 1700 may turn red and pulsate, emphasizing tension. Then per FIG. 18, when the game context changes from combat to a victory celebration, the cursor 1700 may morph into the cursor 1800 of FIG. 18. As shown in FIG. 18, the cursor 1800 may be a green circle with a green check mark inside to demonstrate the victory, and the cursor 1800 might even be animated for virtual fireworks to emanate therefrom.

Figure 19:
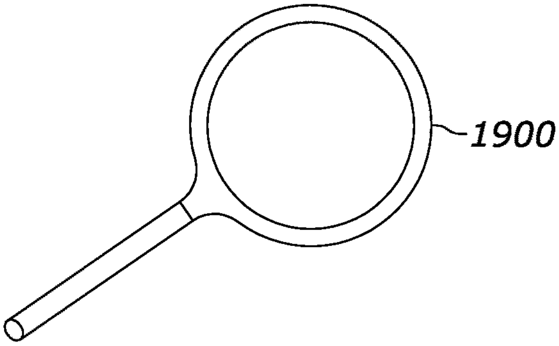
Figure 20:
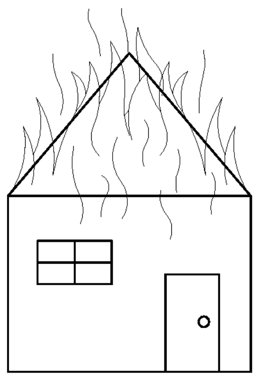

Turning to FIG. 19, during a virtual world exploration context, the cursor 1800 might then transform into a magnifying glass cursor 1900, symbolizing and encouraging viewers/streamers to examine details of the virtual world. FIG. 20 then shows another example where a cursor 2000 may be presented as a house burning down in flames based on the streamer's character's health dropping below a threshold amount (e.g., twenty percent) and/or based on the streamer's character losing a boss battle and dying.

Figure 21:
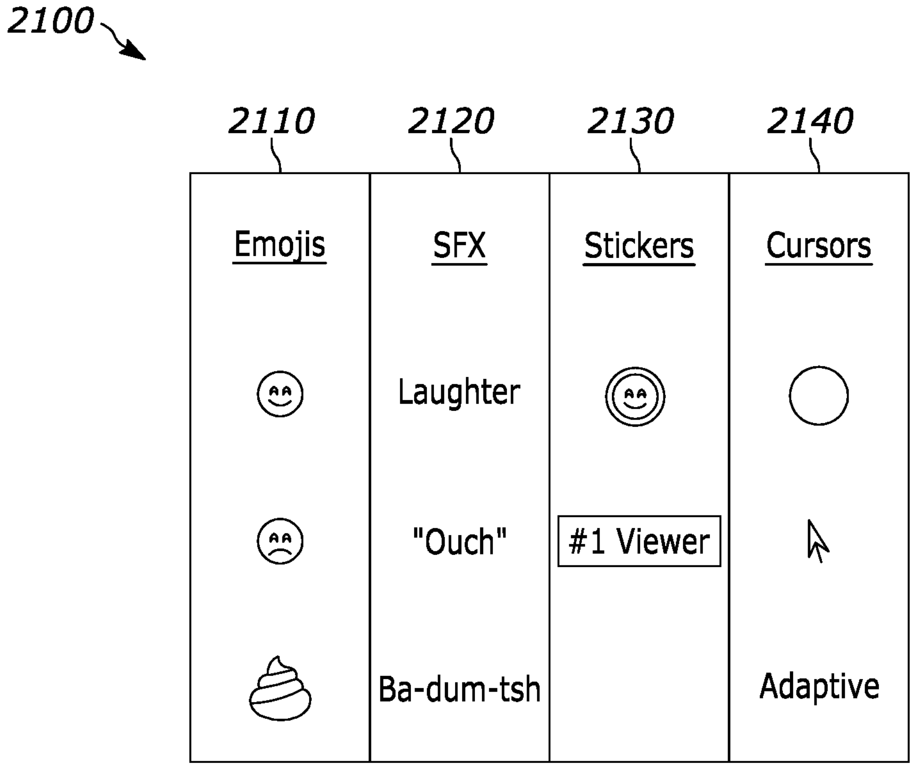
FIG. 21 shows an example GUI including a palette of different selectable objects that may be used by viewers consistent with present principles.

Now in reference to FIG. 21, this figure shows a virtual palette 2100 that may be presented on a viewer's screen while viewing the gameplay of a streamer/gamer. The palette 2100 may therefore be presented as part of the UI mentioned above in reference to FIG. 6, for example, but only on the viewer display and not on the streamer display. It may therefore be presented semi-transparently as an overlay on the game video stream itself, as an opaque inset on the game video, or opaquely off to one side of the video but still on the same display/UI.

As shown in FIG. 21, the palette 2100 may include a first section 2110 presenting various emojis, emotes, and/or other viewer-selectable graphical reactions. The palette 2100 may also include a second section 2120 presenting various respective viewer-selectable sound effects the selection of which may command the game engine to insert the corresponding sound into the audio of the game itself so that the streamer/gamer can hear it while playing the game to appreciate verbal and/or non-verbal audio feedback from the viewer. As shown for the section 2120, verbal feedback might include exclamation of the word "ouch" (top selector), while non-verbal feedback might include laughter (middle selector) or the ba-dum-tsh sound (bottom selector) that often follows jokes in the entertainment industry during broadcasting.

Section 2130 of FIG. 21 shows various stickers and persistent pointer objects that might be selected by the viewer as well. Accordingly, note that viewers send a variety of stickers, emojis, and/or predefined objects from the section 2130. The viewers can therefore drag their chosen element onto the game screen, where it may adhere to a viewer-designated area in the streamer's POV as a persistent overlay that is not removed except possibly upon user command or end of the game or a game level. Each viewer's stickers may even be distinct if desired, so that the streamer knows which sticker is associated with which viewer. The elements may therefore remain in place for a set duration or until removed. Viewers may resize, rotate, and position the elements creatively on the screen, giving them an avenue to express their personality and enhance the visual experience. As examples, the section 2130 indicates that an avatar image of the viewer might constitute one of these elements (top selector) while a "#1 viewer" sticker might constitute another one of these elements (bottom selector).

Thus, it is to be more generally understood that the system may receive a cursor control command directing placement of a graphical object (a sticker from the section 2130) that is uniquely associated with the viewer at a persistent location within the field of view/POV of the streamer as presented on the streamer's own display. So based on the cursor control command, the system may present the graphical object (sticker) at the persistent location.

FIG. 21 also shows that the palette 2100 may include a section 2140 presenting different viewer-selectable cursors that may be used by the viewer and thus presented to the streamer according to the description above. Note that, as examples, a circle pointer is shown (top) along with an arrow pointer (middle) and an option to command the game system to use adaptive pointers per the description above (bottom).

Figure 22:
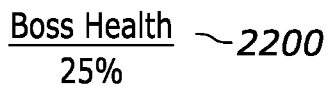

Moving on to FIG. 22, note that dynamic terrain analysis may also be employed by the gaming system to present cursors of different appearances, where the cursor may offer sentiment about the terrain and/or real-time terrain analysis. So, for example, as the streamer explores different areas in the game world, the cursor may adapt to provide information about the game environment/terrain over which the streamer's game character is currently moving. For instance, the cursor may change color or display icons to signify danger zones (like the cursor 1700), to signify hidden treasures, or to signify safe paths. Or as shown in FIG. 22 specifically, the cursor may give information about enemy statistics for a non-player enemy game character of the game. In the present instance, the cursor 2200 indicates a percent remaining of boss health (in relation to a boss being battled by the streamer). Other example stats might include points earned, inventory fullness or inventory items, etc. This dynamic guidance may thus enhance the viewer's understanding of the game world through an adaptive cursor, and aid both the streamer's navigation and decision-making. The stats cursor might even be rotated at predefined time intervals (e.g., every five seconds) between different stats of the boss and/or the streamer's own character.

Figure 23:
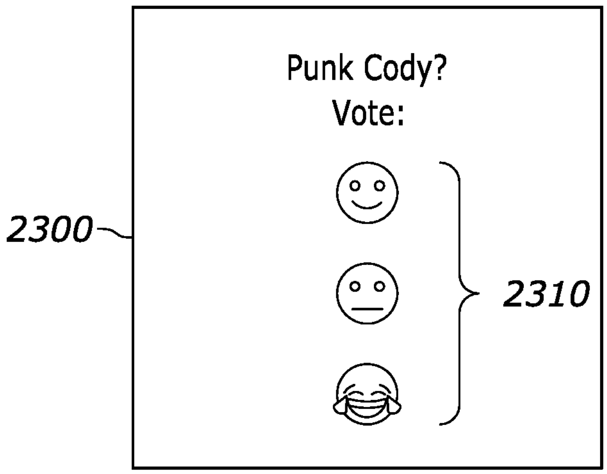
FIG. 23 shows an example sentiment-based reaction poll that may be presented to viewers consistent with present principles.
Figure 24:
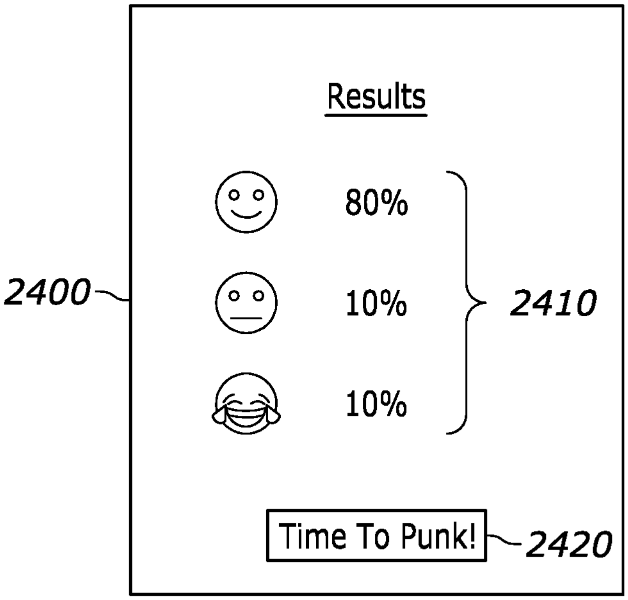
FIG. 24 shows an example results GUI for the poll of FIG. 23 consistent with present principles.

Turning to FIGS. 23 and 24, present principles also include enabling streamer-generated and viewer-generated polls. Thus, both streamers and viewers can create polls and craft questions or prompts for the polls. This might be done by providing audible input to a large language model (LLM) (e.g., ChatGPT-based application programming interface (API)) or to digital assistant being executed by the game engine or system at large, commanding the system to generate a poll according to one or more prompts provided audibly by the person. The LLM or assistant may then generate the poll question and autonomously select different non-verbal reaction-based poll answers that may be selected by others. So, for example, each emoji or other reaction in a reference library might include metadata indicating the sentiment associated with the respective emoji, and so the LLM/assistant may select whatever emojis are associated with sentiments that have been correlated by the LLM/assistant to the poll question as being potential answers. The viewers or other poll respondents may then select their responses using the designated emojis or other reactions.

This is shown in the example of FIG. 23, where the streamer has provided audible input to an LLM asking "Do you guys think I should punk Cody?" where Cody might be another person playing against the streamer. A poll 2300 may then be dynamically generated and presented to the viewers of the game's livestream, where different emojis 2310 may be presented and selected by the viewers as poll responses. As shown, a smiling face emoji and laughing face emoji may be included, and they may be selectable to provide an approving (affirmative) response to the poll question. As also shown, a frowning face emoji may be included and may be selectable to provide a disapproving (negative) response to the poll question.

Responsive to the poll ending after a threshold period of time, streamer-designated period of time, or other trigger, an overlay 2400 as shown in FIG. 24 may then be presented on both the streamer's screen and the screens of the viewers. The overlay 2400 may aggregate and display the poll responses in a visually engaging format, showing the percentage breakdown 2410 of each poll option that was selected. Streamers can acknowledge the viewers' preferences by selecting the selector 2420 (which in turn may cause the digital assistant/system to provide audible output in the form of a computer-generated voice exclaiming "Time to punk!"), and also use this information to tailor their content or make in-game decisions.

Figure 25:
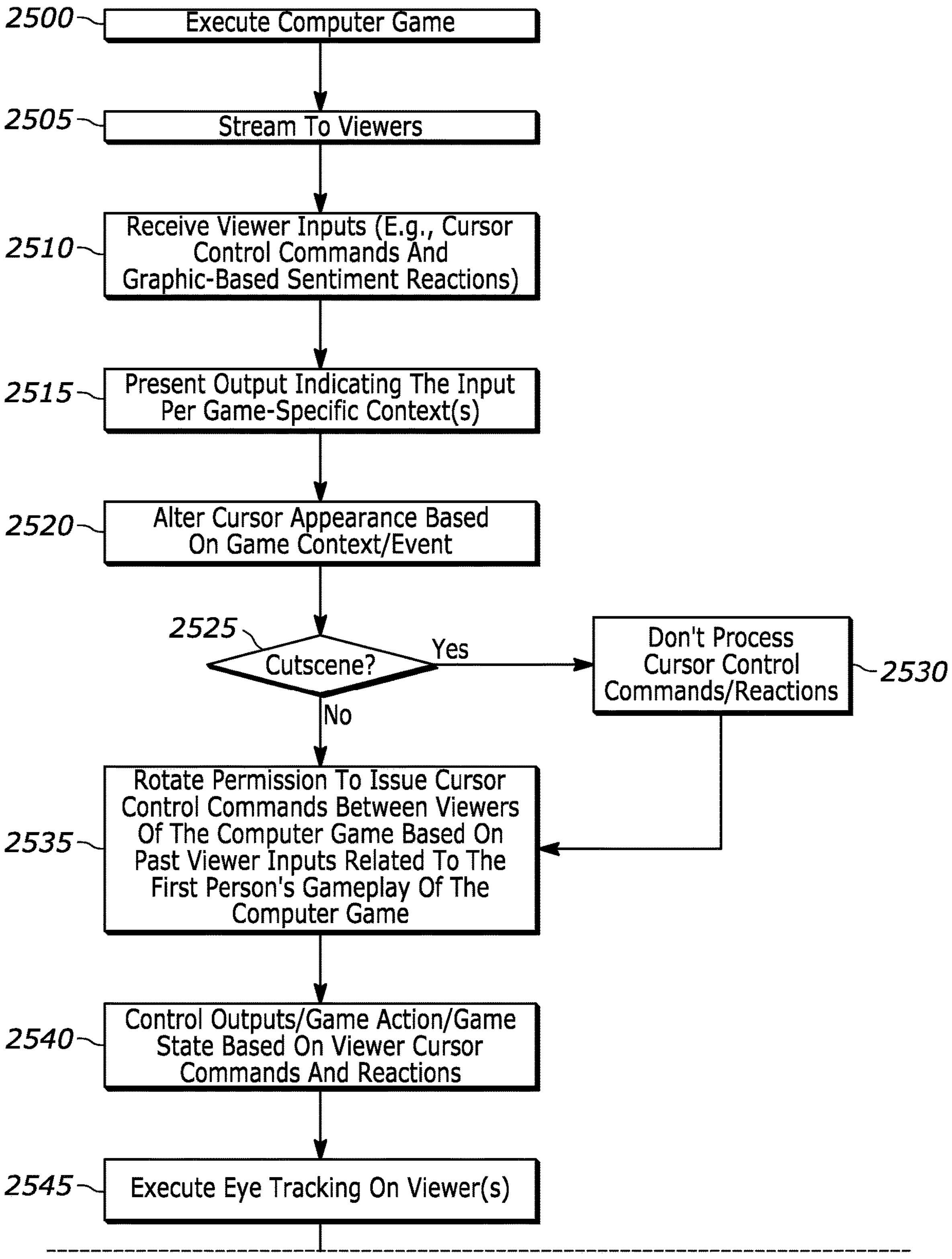
FIG. 25 shows example logic in example flow chart format that may be executed by a processor assembly consistent with present principles.
Figure 25:
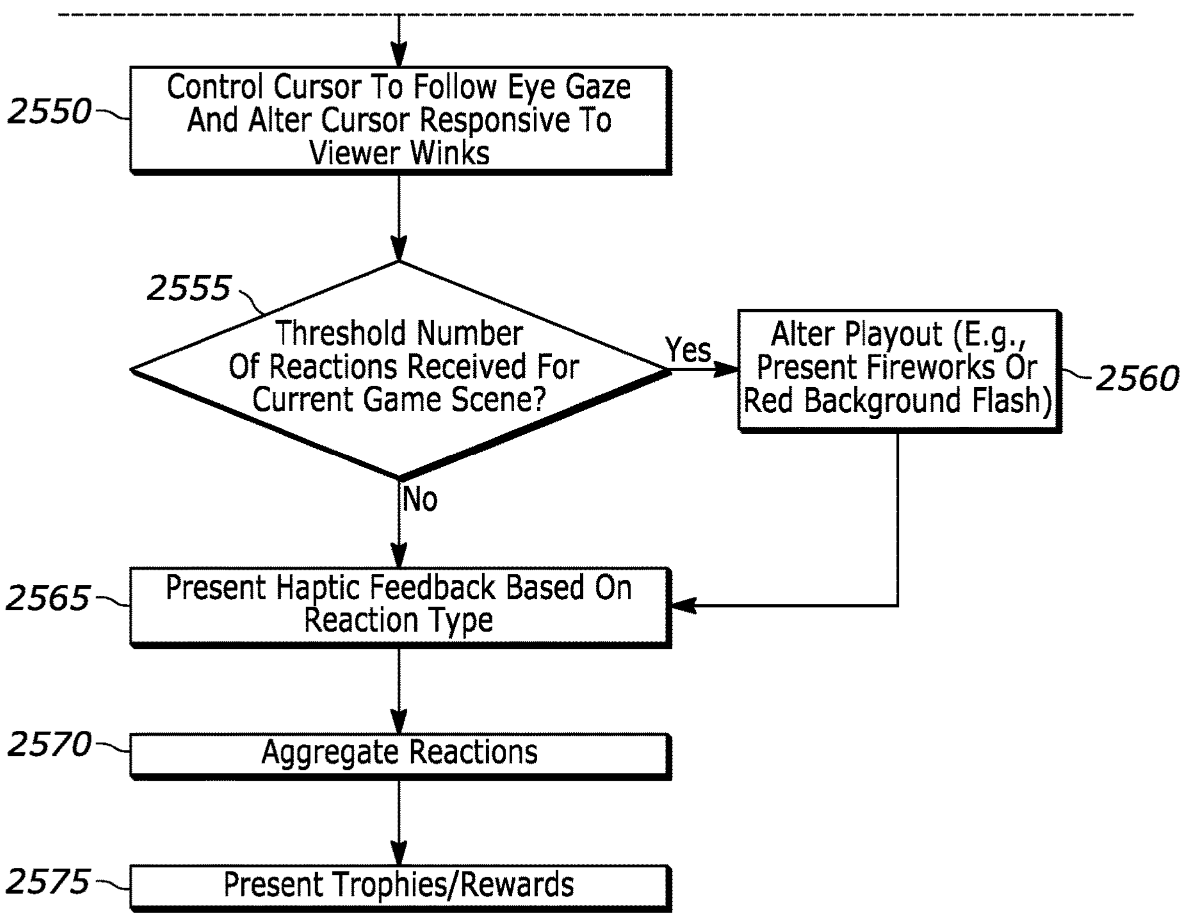

Referring now to FIG. 25, it shows example logic that may be executed by a system such as the system 10 and/or individual components thereof (e.g., a console or remotely-located server) consistent with present principles. Note that while the logic of FIG. 25 is shown in flow chart format, other suitable logic may also be used.

Beginning at block 2500, the system may execute a computer game in which a first person plays the computer game. The logic may then proceed to block 2505 where the system may stream the first person's gameplay to other viewers, e.g., over the Internet, a third-party streaming website, a dedicated console manufacturer's network, etc. Thereafter the logic may proceed to block 2510 where the system may receive inputs from viewers, including at least a second person that is viewing the livestream of the computer game but that is not controlling a character of the game. The input may include a cursor control command to move one of the cursors mentioned above within the first person's field of view/POV, as well as a graphic-based sentiment reaction as also discussed above (e.g., emojis).

The logic of FIG. 25 may then proceed to block 2515 where the system may present, based on the input(s) received at block 2510, one or more corresponding outputs on a display associated with the first person. The output(s) may indicate the input in a game-specific context. As one example of the input being indicated in a game-specific context, at block 2520 the system may alter a cursor's appearance based on game context and/or specific game events as set forth above.

From block 2520 the logic may then proceed to decision diamond 2525. At diamond 2525 the system may, possibly after executing at least a first cursor control command during a first portion of the computer game, determine that a cutscene is occurring (e.g., using an indication from the game engine). In various examples, the cutscene may be a non-interactive scene of the game where user inputs are not processed, with the cutscene beginning once the streamer reaches a certain point in the game (e.g., end of level or the streamer's virtual character dying). The cutscene may thus interrupt gameplay with things such as a conversational sequence between two game characters, a sequence of events relevant to the plotline of the game, an award ceremony where the streamer is provided with one or more rewards, etc.

Based on/responsive to a determination that a cutscene is not occurring, the logic may proceed directly to block 2535 as will be described in a moment. However, based on/responsive to a determination that the cutscene is occurring, the logic may instead proceed first to block 2530 where the system may decline to process additional cursor control commands and/or reactions during playout of the cutscene. Accordingly, a multi-viewer UI like in FIG. 6 may be controlled during the game based on context (e.g., turned on and off), enabling autonomous detection of cutscenes, scene changes, and/or critical moments in the game (e.g., boss battles) for which viewer inputs would be too distracting. When such moments occur, the overlay with the pointer and/or reactions may be temporarily turned off, ensuring that both the streamer and viewers can fully appreciate the narrative without distractions. Once the gameplay resumes from the cutscene, scene change, or end of a boss battle, the interactions can be re-enabled and reappear.

From block 2530 the logic may then proceed to block 2535. At block 2535 the system may in some implementations rotate permission to issue cursor control commands (and even reactions) between viewers of the computer game. This helps avoid situations where multiple cursors are floating around the streamer's screen at the same time, which can be distracting and unduly obstruct the streamer's view of the game video. Thus, only one cursor might be presented at a given time during gameplay in certain implementations, where the viewer that is allowed to control the cursor may be determined based on past viewer inputs related to the first person's gameplay of the computer game.

Accordingly, this feature might be thought of as passing the virtual baton where cursor control operates on a rotational basis. The UI/overlay may, for example, track viewer engagement in terms of reaction amount. As viewers accumulate points through more interactions (cursor controls and/or reactions), the viewers progress higher in a queue and the viewer at the front/top of the queue gains control of the pointer. Control may then remain with that viewer until one or more conditions are met, such as the controlling viewer providing a select command with the cursor, a threshold amount of time ending (e.g., thirty seconds), or the controlling viewer relinquishing control.

Additionally or alternatively, the streamer may decide who gets to use the pointer at a given time by providing an audible command designating a particular user, or simply by audibly commanding the system to "rotate", which might then instigate passing of control to the next viewer in the queue. This feature may thus encourage sustained and gamified engagement for the viewers themselves.

From block 2535 the logic may then proceed to block 2540. At block 2540 the system may continue to control outputs, game actions, and/or the game state based on viewer cursor commands and reactions. The logic may then proceed to block 2545 where the system may in some implementations execute an eye tracking algorithm to track the eyes of one or more viewers using images of the viewer(s) as provided by a camera imaging the viewers' eyes. The camera might be located on a headset being worn by the respective viewer or on a television being used by the respective viewer to view the game, for example.

Eye movement from the viewer may constitute input that may then be used at block 2550 to move the cursor on the streamer's display according to the eye movement input. For example, if the viewer looks left then the cursor goes left by a proportional amount, if the viewer looks right the cursor goes right by a proportional amount, and so on. Also at block 2550, in some examples the system may determine that the tracked viewer has closed one eye, such as to wink or blink with one eye (but not simultaneously with both eyes). Based on determining that the viewer has closed one eye, the system may alter the appearance of the cursor as presented on the streamer's display.

So as a specific example, if the viewer were wearing a virtual reality (VR) headset for VR gameplay viewing, eye tracking sensors on the headset can be utilized to establish a VR eye tracking pointer's movement and send pulses to the pointer as presented on the streamer's display (to pulsate) by the viewer blinking/winking with one eye. This may be an easy and intuitive way to draw the streamer's attention to a game object over which the cursor is moved and then hovers.

After block 2550 the logic may proceed to decision diamond 2555. At diamond 2555 the system, based on receiving receive respective graphic-based reactions from respective people that are viewing the livestream but not controlling a character of the game (such as might occur at block 2540), may determine whether a predetermined graphic-based reaction threshold has been met. This might include a predetermined number of all or the same type of reactions being provided by viewers within a set period of time, such as twenty seconds (impliedly indicating that the reactions all pertain to a same game event while still eliminating false positives from outside the time window). Or this might include a predetermined number of all or the same type of reactions being provided by viewers during a particular game scene or game level more generally. Here, same type may relate to specific emojis each of which is considered its own type, or may relate to emojis grouped into different types based on overall sentiment (e.g., positive sentiment emojis like a happy face and laughter emojis being grouped as one type, and negative sentiment emojis like frown face and angry face emojis being grouped as another type).

A negative determination may cause the logic to proceed directly to block 2565, as will be described shortly. However, first note that an affirmative determination at diamond 2555 may instead cause the logic to proceed to block 2560 responsive to the predetermined graphic-based reaction threshold being met. At block 2560 the system may alter playout of the computer game based on the overall or majority/plurality sentiment establishing at least the threshold number. For example, for an overall positive sentiment reaction accumulation, playout of the game may be altered by presenting fireworks in the background of the game scene. For an overall negative sentiment reaction accumulation, playout of the game may be altered by presenting a red flash in the background of the game scene.

From block 2560 the logic may then proceed to block 2565. At this step, based on one or more graphic-based reactions the system may present haptic feedback to the first person (streamer). The haptic feedback may be presented using a vibrator on a game controller being used by the first person, using a vibrator on a VR headset or other headset type being worn by the first person, using a vibrator on the first person's smartphone or another connected device, etc. The haptic feedback may vary based on a reaction type associated with the graphic-based reaction that instigated the vibration.

So, for example, as viewers send reactions, the streamer may receive subtle haptic feedback corresponding to the type and intensity of reactions. Thus, if a smiling emoji were provided, a vibration of a relatively low intensity/amplitude of separate pulses may be provided, while if a laughing emoji were provided (designated as a more intense positive reaction) then a vibration of a higher intensity/amplitude of separate pulses may be provided. Conversely, if a frowning emoji were provided, a single short vibration of a relatively low intensity/amplitude may be provided, while if an angry-faced emoji were provided (designated as a more intense negative reaction) then a single short vibration of a higher intensity/amplitude may be provided.

From block 2565 the logic may then proceed to block 2570. At block 2570, if desired the system may aggregate sentiment-based reactions provided by plural viewers. This may be done for the purpose of presenting, also at block 2570 and based on the aggregation, a reaction summary to the first person (streamer) that summarizes the amount of reactions received (as broken down and displayed visually by reaction type).

From block 2570 the logic may then proceed to block 2575. At this step the system may do one or more of the following. First, the system may award at least one virtual trophy to the first person (streamer) based on an amount of sentiment-based reactions that were received while the first person played one or more particular aspects of the computer game (e.g., a fight sequence, a game level, a game scene, etc.). Second, the system may reward at least one viewer of the livestream based on inputs provided by that viewer, where the inputs may be established by one or both of cursor control commands and sentiment-based reactions. Rewards may increase proportionally as inputs increase.

Accordingly, in terms of trophies and challenges, a new or unique type of trophy may be provided to the streamer based on the amount of viewer reactions they receive, with the trophy becoming incrementally bigger or more significant as incrementally more viewer inputs are received. Streamers may thus achieve trophies that are predefined as tied to viewer inputs and they may be achieved by sequence, timing, and/or amount of reactions for a certain challenge, game sequence, game level, etc. This concept can even be applied to games with daily/weekly in-game challenges.

In terms of reaction tiers and corresponding rewards for viewers, similar to the above, viewer reactions can be divided into tiers based on levels of engagement (e.g., total amount of reactions provided), such as bronze, silver, and gold levels. As viewers consistently engage with their own reactions, they progress through these tiers, incrementally accumulating engagement points and unlocking different rewards as they incrementally provide more reaction input. A progress bar within the UI overlay that the viewer sees (but possibly not the streamer) might even illustrate the viewer's journey toward the next tier, motivating sustained interaction to get to the next tier. This can also be applied to the streamer side (e.g., where the streamer gets more rewards, game points, etc. for more reactions from viewers).

Figure 26:
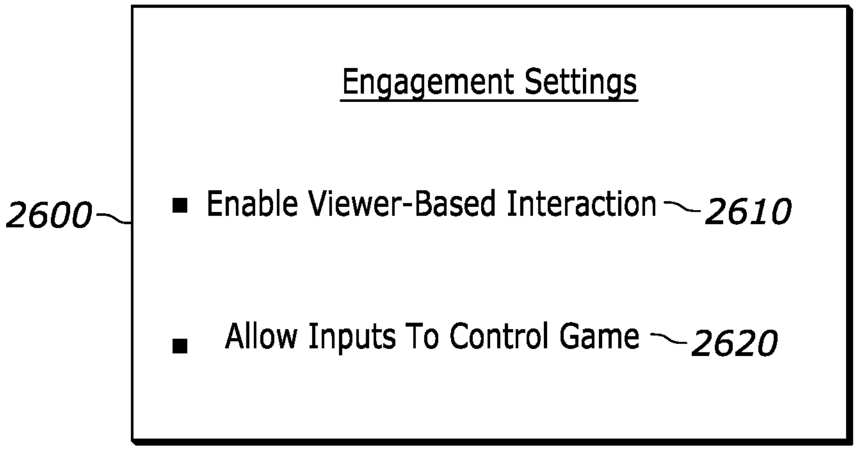
FIG. 26 shows an example settings GUI that may be presented on a display to configure one of more settings of a system/processor assembly to operate consistent with present principles.

Continuing the detailed description in reference to FIG. 26, it shows an example graphical UI 2600 that may be presented on the display of a gaming system to configure one or more settings of the system to undertake present principles. Each of the example options described below may be selected via touch input to the display if touch-enabled, cursor input (e.g., mouse or trackpad input), or other input directed to the associated check box per this example (and indeed any selectable items disclosed herein may be selected by these methods).

As shown in FIG. 26, the GUI 2600 may include a first option 2610 that may be selectable a single time to set/configure the system to, for multiple future games/game instances, execute the functions described above. Option 2610 may therefore be selected to enable viewer-based interaction with the streamer/gamer via cursor control commands and graphic-based non-verbal reactions. So, for example, the logic of FIG. 25 may be executed for multiple future game instances based on the option 2610 being selected beforehand.

The GUI 2600 may also include an option 2620 that may be selected to set or configure the system to allow viewer inputs to actually control the game itself rather than simply to present content to the streamer. So, for example, the option 2620 might be selected to command the system to subsequently execute an algorithm where the system presents selectable graphical objects on the viewer displays as part of the game itself. The system may then receive a cursor control command selecting the selectable graphical object to then, based on the cursor control command, control an output of the computer game as presented on the display associated with streamer. The output itself may have an effect that changes the current game state of the computer game itself.

As a specific example, viewers may be permitted to interact with game layer objects. E.g., using a software development kit (SDK), designated objects in the game world can display markers for viewers to interact. When a viewer clicks on one of these markers, the overlay/UI may send a command to the game to simulate the viewer's input. For instance, if a viewer clicks on a lever in the overlay, the game receives the command to trigger the lever's action and change something within the game itself. This two-way communication may bridge the virtual gap between the viewer, the streamer, and the game, allowing viewers to actively participate in the gameplay.

As another example, consider an SDK for game publishers. It may be a "general" SDK that allows game publishers to define specific triggers, events, objects and responses that occur when viewers interact through the overlay/UI. For instance, a developer could integrate a unique weapon drop or a special character animation triggered by viewer actions. From a store perspective, viewers could also "click" on skins and other digital add-ons to see content in the store available for purchase and/or to add to their wish list.

Additionally, in some cases reactive environments may be employed, where the pointer's actions influence the game environment in real-time. Viewers can use the pointer to activate switches, create temporary bridges, or manipulate objects within the game. These interactions impact the streamer's game progress, potentially leading to secret passages or "easter eggs" where hidden items in the game are revealed.

Thus, more generally, the system may receive a cursor control command and, based on the cursor control command, execute a predefined game action that is possibly reserved only for non-character-controlling people (viewers not playing the video game/controlling a game character) to instigate during the computer game.

Viewers may also mark game layer objects. So, for example, viewers can draw or place markers on the streamer's screen to highlight specific game objects, enemies, or tactical points. As an example, to draw the user might left-click and hold down the left mouse button, and then moving the mouse about to draw on the UI. The cursor may also be controlled to place a visual marker in the streamer's POV (e.g., as anchored to a particular virtual location in the game) by positioning the cursor over a game object and providing a left-click selection up/down without moving the mouse. In some instances, this feature might be executed as part of an SDK too.

Additionally, in terms of viewer-generated tasks, the viewer might use the UI/overlay's drawing tools (some of which were just described) to sketch tasks, challenges, or suggestions directly onto the streamer's screen. The streamer can review the tasks, choose to accept or reject them, or negotiate with the viewers for variations.

Moving to reactions, further note that sentiment-based visual effects are also encompassed by present principles. Thus, the systems disclosed herein add functionality that monitors the cumulative sentiment of reactions of viewers by analyzing factors like the type of reaction, frequency, and velocity. When certain reaction thresholds are met/crossed, the UI/overlay may trigger corresponding visual effects for the streamer and/or viewers. For example, a surge of positive reactions might lead to a cascading animation of fireworks as discussed above, while an influx of negative reactions could prompt a subtle shadow to cast over the screen.

Avatar-based reactions may also be used. Thus, depending on the game's characters or avatars, the reactions' appearance for a particular game may change to match the in-game personas (e.g., the avatar used for a reaction may be in the image of one of the game's characters). Additionally, viewers can personalize their reactions by selecting from a range of animations, icons, or even short sound clips.

Additional visual overlays might be expanded by type as well. These additional overlays may include thematic filters that alter the game's visual palette to match different moods or settings, countdown timers that tick down to in-game events, and sound effects and images that overlay on specific sections of the screen. Viewers and the streamer can activate and deactivate these elements, providing a dynamic and customizable visual experience.

Cursor ghosting might also be used consistent with present principles. So a viewer might use the cursor to select and thus tag the player's character, and then the cursor may autonomously follow the character without further input from the viewer. The cursor itself may even create a visual trail (e.g., comet tail) behind it for where it went.

Hysteresis of the cursor is also encompassed as well. The cursor might fade away, or might disappear to signal something. For instance, it might disappear in flame for a sentiment change ("I was wrong", meaning the viewer was wrong about a suggestion they provided to the streamer).

Additionally, if viewer says "go left" with cursor (e.g., points the cursor to left or writes "L" on screen for "go left"), the cursor/highlighting may stay there where the input is directed. Then when the player doesn't do the action the cursor might persist, and when the player does the action the cursor might disappear. This way viewers know the player responded to their request.

Still further, an artificial intelligence-based model may analyze game objects. So a viewer could point at an object or circle the object with the cursor, and then the object may be highlighted in the game in the color of the pointer itself. The system may thus modify in-game objects based on this feature.

While the particular embodiments are herein shown and described in detail, it is to be understood that the subject matter which is encompassed by the present invention is limited only by the claims.

What is claimed is:

1. An apparatus comprising:
- a processor assembly programmed with instructions to:
  - execute a computer game on a first device;
  - receive raw game state data which includes at least one of metadata, video data, or audio data from which an ongoing game context for the computer game can be determined;
  - receive input from a second device that is viewing a livestream of the computer game but that is not controlling a character of the computer game, the input comprising a cursor control command; and
  - based on the input, cause a presentation of an output on a display associated with the first device, wherein the input comprises the cursor control command, and wherein the output comprises a cursor being presented in an appearance transformable based on the raw game state data matching a change of the ongoing game context for the computer game.

2. The apparatus of claim 1, wherein the output comprises the cursor being presented in an appearance conveying a sentiment associated with the ongoing game context for the computer game.

3. The apparatus of claim 1, wherein the output comprises the cursor being presented in an appearance relevant to a current game event.

4. The apparatus of claim 1, wherein the cursor control command is a first cursor control command, and wherein the processor assembly is configured to:
- execute the first cursor control command during a first portion of the computer game;
- determine that a cutscene is occurring; and
- based on the determination, decline to process additional cursor control commands.

5. The apparatus of claim 1, wherein the cursor control command is a first cursor control command, and wherein the processor assembly is configured to:
- rotate permission to issue cursor control commands between viewers of the computer game based on past viewer inputs related to gameplay by the first device of the computer game.

6. The apparatus of claim 1, wherein the processor assembly is configured to:
- cause, on a display associated with the second device, presentation of a selectable graphical object;
- receive the cursor control command, the cursor control command selecting the selectable graphical object; and
- based on the cursor control command, control an output of the computer game as presented on the display associated with the first device, the output of the computer game having an effect that changes a current game state of the computer game.

7. The apparatus of claim 1, wherein the processor assembly is configured to:

receive the cursor control command, the cursor control command directing placement of a graphical object associated with the second device at a persistent location within a field of view of the first device as presented on the display; and based on the cursor control command, present the graphical object at the persistent location.

8. The apparatus of claim 1, wherein the processor assembly is configured to:

receive the cursor control command, the cursor control command selecting a game object; and based on the cursor control command, highlight the selected game object, the highlighting not comprising a tracing of the cursor control command itself.

9. The apparatus of claim 1, wherein the processor assembly is configured to:

receive the cursor control command; and based on the cursor control command, execute a predefined game action reserved for non-character-controlling people to instigate during the computer game.

10. The apparatus of claim 1, wherein the input comprises eye movement input associated with a second person associated with the second device, and wherein the processor assembly is configured to:

move the cursor on the display according to the eye movement input;

determine that the second person has closed one eye; and alter, based on the determination, the appearance of the cursor as presented on the display.

11. The apparatus of claim 1, wherein the processor assembly is configured to:

present the cursor on the display in a visual appearance conveying a sentiment about terrain over which a first game character is moving.

12. The apparatus of claim 1, wherein the processor assembly is configured to:

present the cursor on the display in a visual appearance indicating data regarding a first game character's current game statistics, the first game character being a game character not controlled by a first person associated with the first device.

13. The apparatus of claim 1, wherein the input further comprises a graphic-based reaction.

14. The apparatus of claim 13, wherein the processor assembly is configured to:

receive respective graphic-based reactions from respective people that are viewing the livestream but not controlling a character of the computer game; and responsive to a predetermined graphic-based reaction threshold being met, alter playout of the computer game, wherein the predetermined graphic-based reaction threshold relates to more than one graphic-based reaction of a same type being received.

15. The apparatus of claim 13, wherein the processor assembly is configured to:

based on the graphic-based reaction, present a haptic feedback to the first device, the haptic feedback varying based on a reaction type associated with the graphic-based reaction.

16. The apparatus of claim 1, wherein the raw game state data includes metadata, video data, and audio data.

17. A method, comprising:

executing a computer game on a first device;

receiving raw game state data which includes at least one of metadata, video data, or audio data from which an ongoing game context for the computer game can be determined;

receiving input from a second device that is viewing a livestream of the computer game but that is not controlling a character of the computer game, the input comprising a cursor control command; and based on the input, causing a presentation of an output on a display associated with the first device, wherein the input comprises the cursor control command, and wherein the output comprises a cursor being presented in an appearance transformable based on the raw game state data matching a change of the ongoing game context for the computer game.

18. The method of claim 17, comprising:

aggregating sentiment-based reactions provided by plural viewers; and based on the aggregation, causing a presentation of a reaction summary on the first device.

19. A system comprising:

at least one computer storage that is not a transitory signal and that comprises instructions executable by at least one processor to:

execute a computer game on a first device;

receive raw game state data which includes at least one of metadata, video data, or audio data from which an ongoing game context for the computer game can be determined;

receive input from a second device that is viewing a livestream of the computer game, the input comprising a cursor control command; and based on the input, cause a presentation of an output on a display associated with the first device, wherein the input comprises the cursor control command, and wherein the output comprises a cursor being presented in an appearance transformable based on the raw game state data matching a change of the ongoing game context for the computer game.

20. The system of claim 19, wherein the instructions are executable to:

award at least one trophy to a first person associated with the first device based on an amount of sentiment-based reactions that are received while playing one or more particular aspects of the computer game; and reward at least one viewer of the livestream based on inputs provided by that viewer, the inputs established by one or more cursor control commands.

* * * * *